(12) United States Patent
Hardtle (10) Patent No.: US 8,662,785 B2
(45) Date of Patent: Mar. 4, 2014

(54) SHAFT-GEAR CONNECTION

(75) Inventor: Wilhelm Hardtle, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/545,458

(22) Filed: Jul. 10, 2012

(65) Prior Publication Data

US 2012/0282018 A1 Nov. 8, 2012

Related U.S. Application Data (63) Continuation-in-part of application No. 12/447,697, filed as application No. PCT/EP2007/060883 on Oct. 12, 2007, now abandoned.

(30) Foreign Application Priority Data

Nov. 4, 2006 (DE) .................... 10 2006 052 104

(51) Int. Cl.
*F16B 4/00* (2006.01)

(52) U.S. Cl.
USPC ........................................ 403/273

(58) Field of Classification Search
USPC .............. 403/273, 355, 359.1, 359.6; 29/447, 29/893.35, 90.7; 72/53, 421 R, 439; 464/182
See application file for complete search history.

(56) References Cited

U.S. PATENT DOCUMENTS

| | | | |
|---|---|---|---|
| 3,750,263 A | 8/1973 | Satzler et al. | |
| 3,831,459 A | 8/1974 | Satzler et al. | |
| 4,171,939 A | 10/1979 | Harwath | |
| 4,312,900 A | 1/1982 | Simpson | |
| 4,462,148 A | 7/1984 | Joyce | |
| 4,509,381 A | 4/1985 | Ikemoto et al. | |
| 4,631,973 A | 12/1986 | Eley | |
| 5,632,684 A | 5/1997 | Kumar et al. | |
| 6,951,150 B2 | 10/2005 | Hedman | |
| 2006/0251472 A1 | 11/2006 | Stauber | |
| 2009/0003927 A1 | 1/2009 | Howes et al. | |

FOREIGN PATENT DOCUMENTS

| | | |
|---|---|---|
| DE | 42 04 814 A1 | 8/1993 |
| DE | 196 20 330 A1 | 11/1997 |
| DE | 103 19 629 A1 | 11/2004 |
| EP | 1 645 346 A1 | 4/2006 |
| JP | 02046319 A * | 2/1990 |
| JP | 2002-227866 A | 8/2002 |

* cited by examiner

*Primary Examiner* — Joshua T. Kennedy
*Assistant Examiner* — Daniel Wiley
(74) *Attorney, Agent, or Firm* — Davis & Bujold, PLLC; Michael J. Bujold

(57) ABSTRACT

A shaft-gear connection comprises a shaft and a shrunk-on gear that has an axial first section, attached by a first shrink-fit bond, and an axial second section, attached by a second shrink-fit bond. The second shrink-fit bond is greater than the first shrink-fit bond so that a greater maximum torque to be transmitted from the gear to the shaft by the second shrink-fit bond than by the first shrink-fit bond. An axial intermediate section, attached by a third shrink-fit bond, is located between the axial first section and the axial second section. Both a surface pressure and a maximum torque that can be transmitted by the third shrink-fit bond are greater than the surface pressure and the maximum torque that can be transmitted by the first shrink-fit bond, but are less than the surface pressure and the maximum torque that can be transmitted by the second shrink-fit bond.

20 Claims, 4 Drawing Sheets

SHAFT-GEAR CONNECTION

This application is a continuation-in-part of U.S. patent application Ser. No. 12/447,697 filed on Apr. 29, 2009, which is a National Stage completion of PCT/EP2007/060883 filed Oct. 12, 2007, which claims priority from German patent application serial no. 10 2006 052 104.8 filed Nov. 4, 2006.

FIELD OF THE INVENTION

The invention relates to a shaft-gear connection comprising a shaft and a shrunk-on gear. The shrunk-on gear has an axial first section that is attached to the shaft by means of a first shrink-fit and an axial second section that is attached to the shaft by means of a second shrink-fit. The second shrink-fit allows greater torques to be transmitted from the gear to the shaft than with the first shrink-fit. The invention also relates to a method for producing such a gear-shaft connection.

BACKGROUND OF THE INVENTION

Shafts that transmit torques and have gears arranged on the shafts are very common in transmission manufacturing. There are a large number of options for attaching these gears to the shaft, whereby the types of connections are generally subdivided into elementary shaft-hub joints and combined shaft-hub joints.

The elementary shaft-hub joints comprise form-locking connections, such as the spline shaft connection, the kerf tooth connection, the involute profile connection, the polygon profile connection, the fitted key connection and the pin connection; the force-fitting connections, such as the crimp connection and the shrink-fit, the keyed joint, the clamping ring connection, the jockey pulley connection and the star washer connection; and the materially engaging connections, such as the welded connection, the soldered connection, and the glued connection.

The combined shaft-hub-joint connections include non materially-engaging connections, such as the pressure knurl connection and the pressure point closure connection; non-materially engaging/materially-engaging connections, such as the pressure adhesion connection, the pressure-soldering connection and the pressure welding connection; and materially engaging connections, such as the soldering-welding connections, for example.

The types of known connections described above are characterized by the disadvantage that movement of the components or, as the case may be, the gears on the shaft is not prevented. Despite optimized design, microscopic movements do occur, for example, due to load peaks. This kind of movement of the gears on the shafts must be avoided at all costs, particularly in transmissions in which exact alignment of gear teeth of different gears in relation to each other plays a decisive role. This is particularly the case in transmissions with load distribution between two or more countershafts; here, absolute placement precision is required throughout the lifetime of the transmission.

In order to resolve the problem cited above, DE 196 20 330 A1 proposes a shaft-hub-joint connection for a component on a shaft in which, on the one hand, the component is shrunk-fit to the shaft and, on the other, in which it is also held in place by means of a form-locking connection, in order to avoid movement. More precisely, the cited document proposes to attach a gear to the shaft by means of a shrink-fit and to provide a pin-shaped element that extends, on the one hand, into the shaft and, on the other, into the gear, to obtain a form-locking connection.

An additional permanent shaft-hub connection is known from DE 103 19 629 A1 in which the gear is attached by means of a shrink-fit to the shaft, i.e. by means of shrink-fitting. The cited document also proposes that immediately adjacent gears partially overlay each other, in which case the adjacent regions of the gears are also connected by means of a shrink-fit.

The shaft-hub connections known from the previous documents comprise gears with an axial first section that has external cogging and an axial second section that has no gear teeth. Shrink-fitting these gears to the shaft causes shrinkage stress that is superimposed on the stress on the bases of the gear teeth, so that a multi-axial stress-state arises in the first section. In the worst possible case, this multi-axial stress-state can lead to a break in one or more of the gear teeth of the cogging. For this reason, the practice has been modified so that in the axial first section, which is provided with the cogging, a weaker shrink-fit is produced than is produced in the axial second section, so that there is less shrinkage stress in the axial first section. In this way, through a reduction in the shrinkage stress in the axial first section, damage to the cogging from superposition of stress can be avoided. This measure has the disadvantage, however, of reducing the maximum torque that can be transmitted from the gear to the shaft.

SUMMARY OF THE INVENTION

The basic object of this invention is therefore to create a shaft-gear connection with a shaft and a shrunk-fit gear that enables the transmission of a great torque from the gear to the shaft, while at the same time effectively preventing damage to the gear teeth. A further object of the invention is also to propose a method of manufacturing this kind of advantageous shaft-gear connection.

The inventive shaft-gear connection features a shaft and a gear that is shrunk-fit to the shaft. The gear comprises an axial first section that is attached to the shaft by means of a first shrink-fit and an axial second section in which the axial second section is attached to the shaft by means of a second shrink-fit. Here, the second shrink-fit is configured in such a way that greater torques can be transmitted with it from the gear to the shaft, or in the opposite direction, than can be transmitted with the first shrink-fit. Inventively, an axial intermediate section is provided between the axial first section and the axial second section, the intermediate section being attached to the shaft by means of a third shrink-fit. The third shrink-fit allows greater torques to be transmitted from the gear to the shaft than the first shrink-fit and smaller torques than the second shrink-fit. This characteristic relates to the maximum torques which can be transmitted in each case. Different transmissions of torques can be achieved here, for example, by an appropriate selection of the surface pressure, during shrink-fitting, in the axial first section, in the axial second section and in the axial intermediate section.

A continuous transfer of strain can be achieved between the axial first section and the axial second section by means of the axial intermediate section and the inventive selection of the third shrink-fit. In turn, this continuous transfer of strain makes it possible for greater torques which are induced, for example, via a set of gear teeth in the axial first section to be transmitted from the gear to the shaft of the shaft-gear connection.

In a preferred embodiment of the inventive shaft-gear connection, the third shrink-fit is configured in such a way that the magnitude of the torque transmitted from the gear to the shaft in the direction of the axial second section is increased in the axial intermediate section. An increase of this kind in the transmittable torque can take place incrementally in the direction of the axial second section. The example embodiment explained below, however, is particularly advantageous.

In this particularly preferred example embodiment of the inventive shaft-gear connection, the third shrink-fit is designed in such a way that the magnitude of the torque, which can be transmitted from the gear to the shaft in the direction of the axial second section, is continually, or, as the case may be, constantly increased in the axial intermediate section. By designing the transfer of stress between the axial first section and the axial second section to be continuous, the magnitude of the torque that can be transmitted from the gear to the shaft can be additionally increased.

According to an advantageous embodiment of the inventive shaft-gear connection, the axial first section is provided with cogging, preferably external teeth, whereby the axial second section is not provided with any gear teeth.

In a particularly advantageous embodiment of the inventive shaft-gear connection, the sets of gear teeth have a plurality of teeth, whereby the bases of the teeth are ground. For example, the right and left flanks of the teeth in the region of the tooth bases can be ground. The ground bases of the teeth can tolerate greater stress than non-ground tooth bases. In this way, it is possible to make the first shrink-fit in the axial first section stronger, because the shrink stress in the axial first section can be greater without resulting in the superposition of stress resulting in damage to the gear teeth. It is possible, however, to transmit a greater torque, via the gear, to the shaft with a stronger first shrink-fit in the axial first section.

According to an additional advantageous embodiment of the inventive shaft-gear connection, the bases of the teeth are ground using a blasting method. The bases of the teeth are advantageously ground using sand and/or glass-bead blasting media, for example. Using this method, the bases of the gear teeth have proven particularly robust.

In order to particularly effectively avoid the gear teeth breaking in the region of the tooth bases, the bases of the gear teeth are ground with the help of at least two successive blasting methods in a particularly preferred embodiment of the inventive shaft-gear connection. This is also referred to as a so-called duo-blasting of the tooth base. The successive blasting methods are preferably two different blasting methods, such as sand-blasting and glass-bead blasting. The more stable the bases of the gear teeth are, the stronger the first shrink-fit in the axial first section can be, and the stronger the torque that can be transmitted from the gear to the shaft.

In another preferred embodiment of the inventive shaft-gear connection, at least one additional gear, that is not shrunk-fit, is attached to the shaft. The additional gear can, for example, be attached with the aid of a feather key or some other component. The bases of the gear teeth of the shrunk-fit gear are then designed wider, as compared to the bases of the gear teeth of the non shrunk-fit gear. This also increases the stability of the gear teeth of the shrunk-fit gear which makes it possible to have a stronger first shrink-fit in the axial first section which, in turn, makes it possible to transmit especially great torques from the gear to the shaft.

According to another advantageous embodiment of the inventive shaft-gear connection, the height of the gear teeth is diminished in the direction of the axial second section. Preferably, the height of the teeth in the direction of the axial second section is continuously diminished. For example, in the region of the axial intermediate section, the teeth can extend, continuously diminishing in height, until they merge into the axial second section.

According to an additional advantageous embodiment of the inventive shaft-gear connection, the gear is additionally attached to the shaft by means of a friction-weld. This friction-weld is advantageously produced by twisting the shaft in relation to either the gear during, or after, the shrink-fitting procedure.

The inventive method of producing a shaft-gear connection comprises the process steps indicated below. First, a shaft and a gear are prepared, whereby the gear has an axial first section, an axial second section, and an axial intermediate section located between the axial first section and the axial second section. Then the gear is shrunk-fit to the shaft, so that a first shrink-fit is formed in the axial first section, a second shrink-fit in an axial second section, and a third shrink-fit in the axial intermediate section. The shrink-fitting is performed in such a way that the third shrink-fit forms a bond that allows greater torques to be transmitted from the gear to the shaft than the first shrink-fit bond but allows smaller torques than the second shrink-fit bond. This can be accomplished, for example, by either the shaft and/or the gear having different external and internal diameters in the region of the first, the second and the intermediate sections, so that in the specific sections, different surface pressures and different bond strengths can be produced. For the advantages of this, reference is made to the previous description of the inventive shaft-gear connection.

In a preferred embodiment of the inventive method, the axial first section of the gear is provided with cogging, preferably external cogging with a plurality of gear teeth, while the axial second section has no teeth, whereby the bases of the teeth are ground. Here, fundamentally, virtually any conventional grinding process can be utilized.

In order to produce particularly stable tooth bases, however, the bases of the gear teeth in a particularly preferred embodiment of the inventive method are ground with the aid of a blasting method. This is preferably done using sand and/or glass-bead blasting.

In an additional, particularly preferred embodiment of the inventive method, the bases of the gear teeth are ground using at least two sequential and successive grinding processes, such as sand-blasting and glass-bead blasting, for example.

In order to additionally increase the maximum possible torque transmission between gear and shaft, the shaft and the gear are twisted in relation to each other, either during or after the shrink-fitting in an additional preferred embodiment of the inventive method, in order to produce or form a friction-weld between the shaft and the gear.

BRIEF DESCRIPTION OF THE DRAWINGS

The invention will be explained in more detail below on the basis of one exemplary embodiment with reference to the associated drawings.

FIG. 2 diagrammatically shows a diagram illustrating the maximum transmittable torque in the axial sections, and FIG. 3. diagrammatically shows a partial view of the gear teeth in the direction of the arrow A in FIG. 1;

DETAILED DESCRIPTION OF THE PREFERRED EMBODIMENTS

Figure 1:
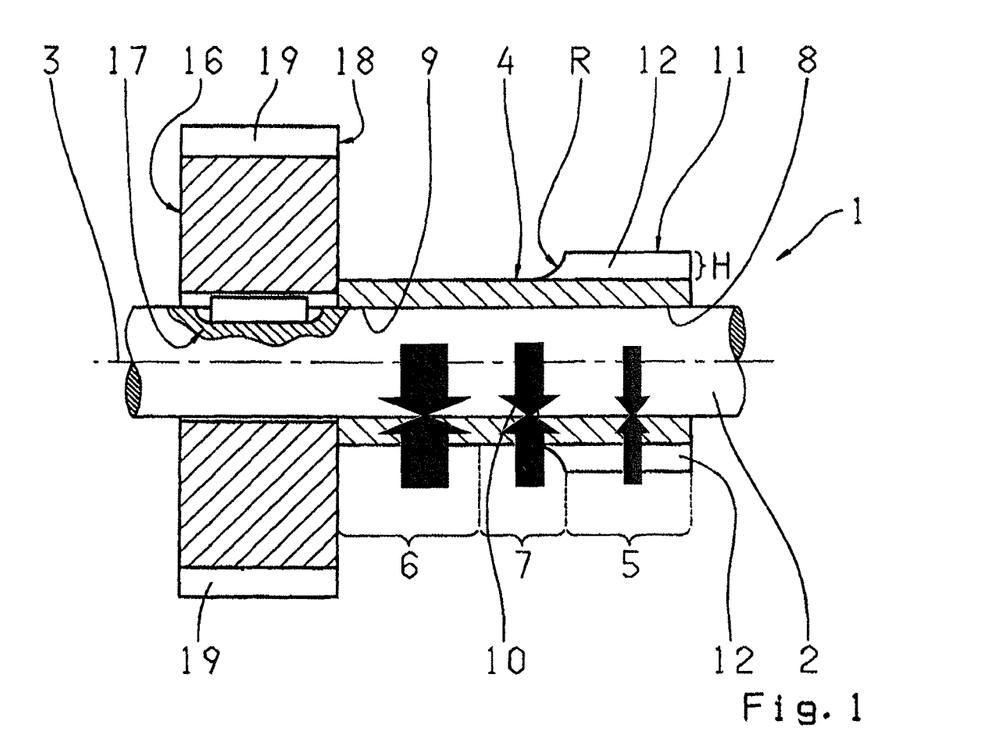
FIG. 1 diagrammatically shows a lateral view of an embodiment of the inventive shaft-gear connection in a cross-sectional presentation.

FIG. 1 presents a lateral view of an embodiment of the inventive shaft-gear connection 1. To start with, the shaft-gear connection 1 comprises a shaft 2 that is rotatable around a longitudinal axis 3 thereof. A gear 4 is shrunk-fit to the shaft 2 so as to permanently and constantly rotate with the shaft 2. The gear 4 comprises an axial first section 5 and an axial second section 6, and an intermediate section 7 is provided between the axial first section 5 and the axial second section 6. The first, intermediate and second sections referred to as 5, 7, 6 are integral with and directly attached to one another to form a single, unitary component. The first section 5 has an axial length $L_5$ of typically between 30 mm and 80 mm; the second section 6 has an axial length $L_6$ of typically between 20 mm and 60 mm; and the intermediate section 7 has an axial length $L_7$ of typically between 5 mm and 30 mm.

The axial first section 5 is attached to the shaft 2 by a first shrink-fit 8, while the axial second section 6 is attached to the shaft 2 by a second shrink-fit 9. The axial intermediate section 7 is also attached to the shaft by a shrink-fit, whereby the third shrink-fit is referred to in FIG. 1 by the reference numeral 10.

Figures 2, 3:
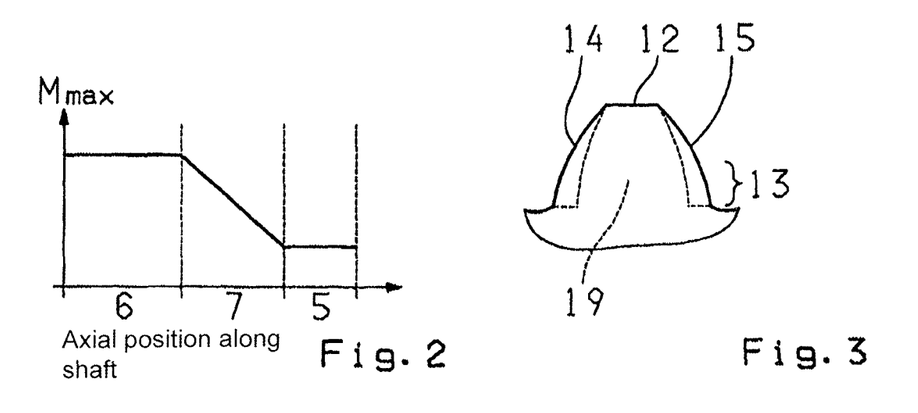

As can be seen in FIG. 2, the second shrink-fit 9 is designed in such a way that in the axial second section 6, a greater maximum torque can be transmitted from the gear 4 to the shaft 2 than is the case with the axial first section 5. Via the third shrink-fit 10, in the axial intermediate section 7, a greater maximum torque can be transmitted from the gear 4 to the shaft 2 than is the case with the axial first section 5, whereas the maximum torque that can be transmitted by the third shrink-fit 10 is less than the maximum torque that can be transmitted by the second shrink-fit 9. The third shrink-fit 10 is designed in such a way that the magnitude of the maximum torque which can be transmitted from the gear 4 to the shaft 2, in the direction of the axial second section 6, in the axial second intermediate section 7 is continuously or, as the case may be, constantly increasing. In this way, there is continuous transfer of the strain between the axial first section 5 and the axial second section 6.

As can be seen from FIG. 1, the axial first section 5 of the gear 4 has external teeth 11. The axial second section 6, however, does not have any teeth at all. The external teeth 11 are preferably designed as helical gearing and comprise a plurality of teeth 12. One of the teeth 12 is shown as an example in FIG. 3. The section of each tooth 12, facing the longitudinal axis 3, is designated as tooth base 13. The left flank 14 and the right flank 15 of the tooth 12 are, at least in the region of the tooth base 13, ground by a blasting method, preferably sand and/or glass-bead blasting. During this process, the tooth bases are ground by the so-called duo-blasting in which two successive blasting methods, of different types, are used, as for example blasting with sand and glass beads. In addition, the height H of the teeth 12 is diminished in an axial direction, specifically in the direction of the axial second section 6. During this process, the height H is continuously reduced, whereby the upper edge is depicted as a circular arc in the lateral view. In that way, by selecting a particularly large radius R for the circular arc, it is possible to have particularly continuous transition from the gearing to the axial intermediate section 7 of the axial second section 6. This results in a particularly good and continuous transfer of the stress between the three sections 5, 6, 7.

Furthermore, at least one additional gear 16, which is not shrunk-fit to the shaft 2, is attached to the shaft 2. In the present example, the gear 16 instead is connected to the shaft 2 by a feather key 17, for example. The additional gear 16 also has external gearing 18 which is made up of a plurality of teeth 19. As indicated in FIG. 3, the bases 13 of the teeth 11 of the shrunk-fit gear 4 are designed broader as compared to the tooth bases of the gearing 18 of the gear 16 that is not shrunk-fit, in which the teeth 19 of the gearing 18 of the gear 16 are indicated by a dotted line.

Furthermore, the gear 4 is attached by a friction-weld to the shaft 2. This friction-weld is produced by twisting the gear 4 around the longitudinal axis 3 relative to the shaft 2, either during or after shrink-fitting to the shaft 2, whereupon a friction-weld is produced. The different strengths of the shrink-fits 8, 9, 10 can be achieved, for example, by the shaft 2 and/or the gear 4 having slightly different external or, as the case may be, internal diameters in the first, second and intermediate sections 5, 6, 7. In this way, after shrink-fitting the gear 4 to the shaft 2, different surface pressures are achieved which ultimately result in different shrink-fit strengths and holding forces as well as the ability to transmit different torques.

Furthermore, the achieved three shrink fit bonds or connections 8, 9, 10, between the shaft 2 and the gear 4 at the three different sections 5, 6, 7, preferably have three different strengths. The second shrink fit bond 9, between the shaft 2 and the gear 4 and formed along the second section 6, is the strongest, e.g., typically between 115 N/mm$^2$ and 140 N/mm$^2$ or more. The first shrink fit bond 8, between the shaft 2 and the gear 4 and formed along the first section 5, is the weakest, e.g., typically between 55 N/mm$^2$ and 40 N/mm$^2$ or less. The third shrink fit bond 10, between the shaft 2 and the gear 4 and formed along the intermediate section 7, is in the middle, e.g., typically between 90 N/mm$^2$ and 150 N/mm$^2$. That is, the strength of the third shrink fit bond 10, is typically greater than the bond strength of the first section 5 but less than the bond strength of the second section 6.

Figure 4:
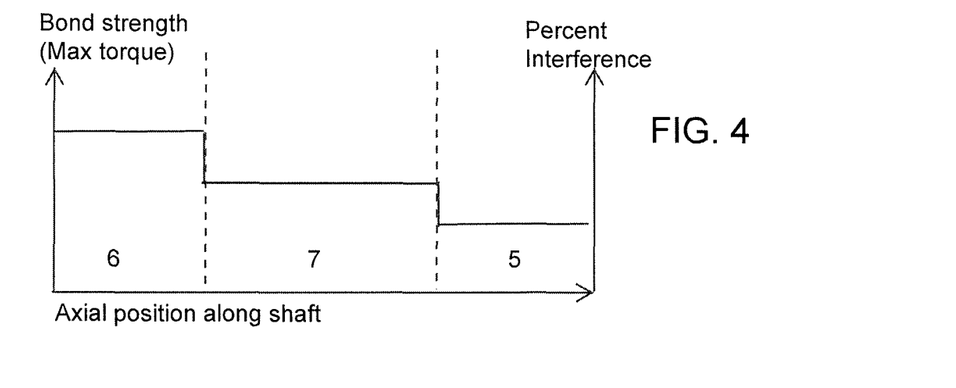
FIG. 4 is a diagram illustrating the relationship between bond strength and the percent interference, between the gear and the shaft, in the axial sections for an embodiment with a constant diameter intermediate section.
Figure 5:
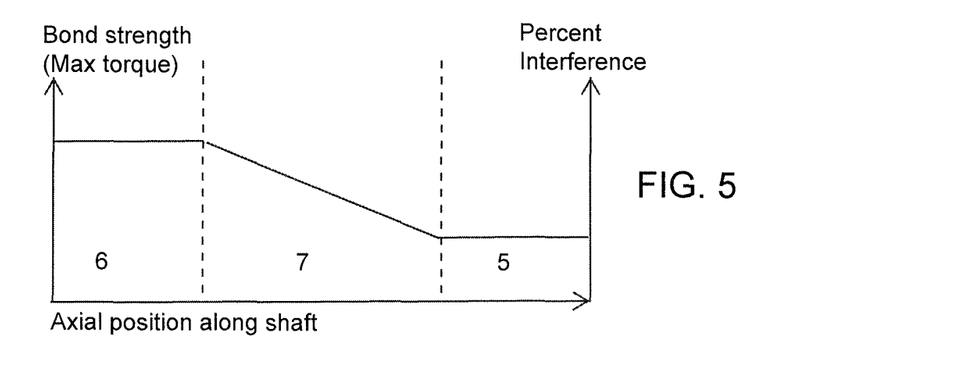
FIG. 5 is a diagram illustrating the relationship between bond strength and the percent interference, between the gear and the shaft, in the axial sections for an embodiment with a continuously decreasing intermediate section.
Figure 6:
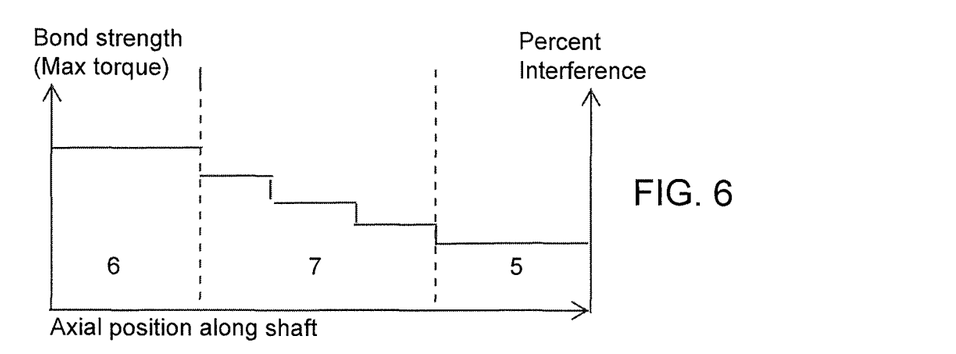
FIG. 6 is a diagram illustrating the relationship between bond strength and the percent interference, between the gear and the shaft, in the axial sections for an embodiment in which a diameter of the intermediate section decreases in a step-wise or incremental manner FIG. 7 diagrammatically shows the interference fit between the axial sections of the gear and a shaft having a constant exterior diameter.

Additionally, as shown in FIG. 4, the adhesion or bond strength, between the gear 4 and the shaft 2, can generally be a single constant value across the entire axial length of the intermediate section 7. Further, as shown in FIG. 5, the adhesion or bond strength, between the gear 4 and the shaft 2, can gradually and progressively decrease in strength, across the entire axial length of the intermediate section 7, from the second section 6 to the first section 5. Alternatively, as shown in FIG. 6, the adhesion or bond strength, between the gear 4 and the shaft 2, can gradually decrease in strength in a step-wise or an incremental manner, across the entire axial length of the intermediate section 7, from the second section 6 to the first section 5.

Figure 7:
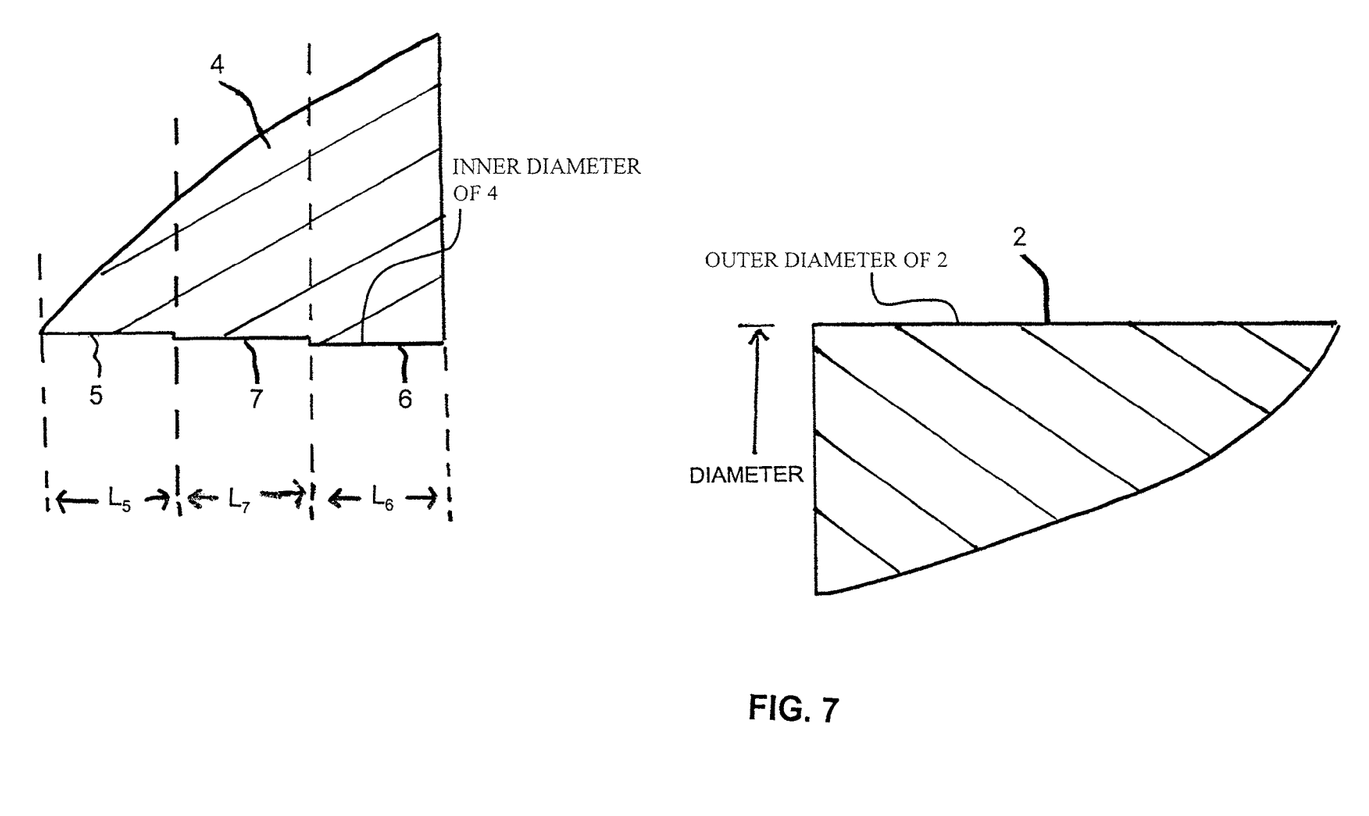

When engaging a shaft 2 which has a constant exterior diameter, the through bore diameter of each of the first section 5, the second section 6 and the intermediate section 7, of the gear 4, will typically be different from one another (see FIG. 7). As a result of such arrangement, when the gear 4 is shrink fitted onto the shaft 2 having a constant exterior diameter, this results in the three different sections 5, 6, 7 each having different bonding, securing and/or holding strengths with the shaft 2. The through bore diameter of the first section 5 will be slightly larger (e.g., between 0.075 mm and 0.060 mm or between 0.1 percent and 0.08 percent larger) than the average through bore diameter of the intermediate section 7 while the average through bore diameter of the intermediate section 7 will be slightly larger (e.g., between 0.025 mm and 0.020 mm or between 0.03 percent and 0.025 percent larger) than the through bore diameter of the second section 6. As indicated above, the diameter of the through bore of the intermediate section 7 can be a single constant diameter (see FIG. 4), or can be a constant, continuously decreasing diameter (see FIG. 5), or be a diameter that decreases in a step-wise or incremental manner (see FIG. 6) from the second section 6 to the first section 5.

Figure 8:
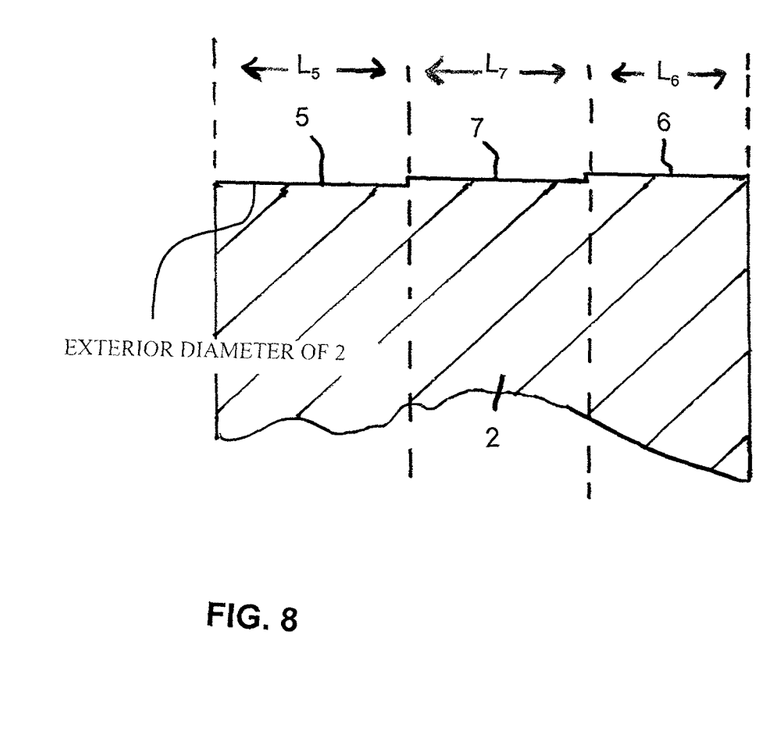
FIG. 8 diagrammatically shows the interference fit between the axial sections of the shaft and a gear having a constant through bore diameter.

Alternatively, in the event that the gear 4 has a constant through bore diameter extending therethrough, the exterior diameters of each of the first section 5, the second section 6 and the intermediate section 7 of the shaft 2 will typically be different from one another (see FIG. 8). As a result of such arrangement, when the gear 4 with a constant through bore diameter is shrink fitted onto the shaft 2 having the three sections with different exterior diameters, this results in the three different sections 5, 6, 7 having at least three different bonding, securing and/or holding strengths with the shaft 2. The exterior diameter of the second section 6 will be slightly larger than the average exterior diameter of the intermediate section 7 while the average exterior diameter of the intermediate section 7 will be slightly larger than the exterior diameter of the first section 5.

When the gear 4 is shrunk fit to the shaft 2, the degree of overlap or interference of the external diameter of the shaft with the internal diameter of the gear creates an interference fit. The percent interference is calculated by subtracting the exterior diameter of the shaft 2 from the internal diameter of the gear 4, and dividing the difference by the exterior diameter of the shaft 2. The larger the positive result, the greater the interference fit and the stronger the bond strength.

As shown in FIGS. 4-6, the greater the interference or overlap between the gear 4 and the shaft 2, the greater the interference fit/bond strength between the gear 4 and the shaft 2, and conversely the smaller the interference or overlap between the gear 4 and the shaft 2, the smaller the interference fit/bond strength between the gear 4 and the shaft 2.

These surface pressures or the bond or adhesive strengths determine the maximum torque that can be transmitted or transferred, from the gear 4 to the shaft 2, by each one of the three distinct shrink fit connections 5, 6, 7, with such bonds being achieved by the three closely adjacent and associated but distinct shrink fit connections. These bond strengths can also be described as the maximum torque that can be transmitted by each one of the three shrink fit connections, before the gear 4 rotates relative to the shaft 2, if the counter torque or load on the shaft 2 was unlimited. As shown in FIGS. 2 and 4-6, the surface pressures or bond strength between the shaft 2 and the gear 4 at the third shrink-fit connection 10 are greater than the surface pressure or bond strength between the shaft 2 and the gear 4 at the first shirk-fit connection 8, while the surface pressures or bond strength of the third shrink-fit connection 10 are less than the surface pressure or bond strength between the shaft 2 and the gear 4 at the second shirk-fit connection 9. These differences in surface pressures or bond strength are caused by different shrunk fit interferences of the respective sections 5, 6, 7 of the through bore diameters of the gear 4 and external diameters of the shaft 2.

It is to be noted that the respective bond strengths of the shrink fit connections of the different sections 5, 6, 7, and thus the maximum torque that can be transmitted or transferred from the gear to the shaft, are independent of the size of the cogs or the height or the presence of gear teeth. That is, it does not matter if the maximum torque is applied to the gear by a higher force with a smaller distance to the center axis or if the same maximum torque is applied to the gear by a lower force at a larger distance from the center axis, the strength of the connections/bond strengths/surface pressures will be the same in either case.

REFERENCE CHARACTERS

1 Shaft-gear connection
2 Shaft
3 Longitudinal axis
4 Gear
5 Axial first section
6 Axial second section
7 Axial intermediate section
8 First shrink-fit
9 Second shrink-fit
10 Third shrink-fit
11 External teeth
12 Teeth
13 Tooth base
14 Left flank
15 Right flank
16 Additional gear
17 Feather key connection
18 External gearing
19 Teeth
H Height of the teeth
$M_{max}$ Maximum transmittable torque in one section
R Radius

I claim:

1. A shaft-gear connection comprising:
a shaft (2) having a generally cylindrical external diameter; and
a shrunk-on gear (4) having an internal diameter with an axial cylindrical first section (5), which is shrunk-fitted with the cylindrical external diameter of the shaft (2) by a first shrink-fit bond (8) and an exterior diameter of the axial cylindrical first section (5) supporting a plurality of external gear teeth (12), and an axial cylindrical second section (6), which is shrunk-fitted with the cylindrical external diameter of the shaft (2) by a second shrink-fit bond (9), with the second shrink-fit bond (9) being tighter than the first shrink-fit bond (8) so as to enable a greater maximum torque to be transmitted, from the gear (4) to the shaft (2), by the second shrink-fit bond (9) than a maximum torque that can be transmitted by the first shrink-fit bond (8),
wherein the gear (4) and the shaft (2) have an axial intermediate section (7), located between the axial cylindrical first section (5) and the axial cylindrical second section (6), shrink-fitted to the shaft (2) by a third shrink-fit bond (10),
both surface pressures between the shaft (2) and the gear (4) at the third shrink-fit bond (10) and a maximum torque that can be transmitted from the gear (4) to the shaft (2) by the third shrink-fit bond (10) are, respectively, greater than a surface pressure between the shaft (2) and the gear (4) at the first shirk-fit bond (8) and the maximum torque that can be transmitted by the first shrink-fit bond (8), and
both surface pressures between the shaft (2) and the gear (4) at the second shrink-fit bond (9) and a maximum torque that can be transmitted from the gear (4) to the shaft (2) by the second shrink-fit bond (9) are, respectively, greater than the surface pressure between the shaft (2) and the gear (4) at the third shrink-fit bond (10) and the maximum torque that can be transmitted by the third shrink-fit bond (10).

2. The shaft-gear connection according to claim 1, wherein the third shrink-fit bond (10) is designed such that a magnitude of the maximum torque that can be transmitted from the gear (4) to the shaft (2) increases in the axial intermediate section (7) in a direction from the axial first section (5) toward the axial second section (6).

3. The shaft-gear connection according to claim 2, wherein the third shrink-fit bond (10) is designed such that the magnitude of the maximum torque that can be transmitted from the gear (4) to the shaft (2) continuously increases, in the axial intermediate section (7), in the direction from the axial first section (5) toward the axial second section (6).

4. The shaft-gear connection according to claim 2, wherein only the axial first section (5) has the plurality of external gear teeth, while the axial second section (6) of the gear (4) has no teeth.

5. The shaft-gear connection according to claim 4, wherein bases (13) of the plurality of gear teeth (12) are ground.

6. The shaft-gear connection according to claim 5, wherein the bases (13) of the gear teeth (12) are ground by at least one of sand-blasting and glass-pearl blasting.

7. The shaft-gear connection according to claim 6, wherein the bases (13) of the gear teeth (12) are ground by at least two different successive blasting methods.

8. The shaft-gear connection according to claim 5, wherein at least one additional gear (16) is attached to the shaft (2) by a different method than shrink-fitting, and the bases (13) of the gear teeth (12) of the gearing (11) are broader than bases of gear teeth of gearing (18) of the at least one additional gear (16).

9. The shaft-gear connection according to claim 5, wherein a height (H) of the gear teeth (12), in a direction of the axial second section (6), continuously decreases.

10. The shaft-gear connection according to claim 1, wherein the gear (4) is further attached to the shaft (2) by a friction-weld.

11. The shaft-gear connection according to claim 1, wherein the gear is attached to the shaft by relative twisting of the shaft and the gear during either the shrink-fitting procedure or following the shrink-fitting procedure.

12. A method of producing a shaft-gear connection, the method comprising the steps of:
preparing a shaft with a cylindrical external diameter;
preparing a gear with an internal diameter comprising an axial cylindrical first section, an axial cylindrical second section, and an axial cylindrical intermediate section located between the first and second sections; and
shrink-fitting the cylindrical external diameter of the gear to the cylindrical external diameter of the shaft so that
a loosest shrink fit and first shrink-fit bond (8) with a smallest bond strength, between the shaft (2) and the gear (4), is achieved in the axial first section with an exterior diameter of the first section (5) supporting a plurality of external gear teeth (12),
a second shrink-fit bond (9) with a tightest shrink fit and largest bond strength, between the shaft (2) and the gear (4), is achieved in the axial second section, and
a third shrink-fit bond (10) with an intermediate bond strength, between the shaft (2) and the gear (4), is achieved in the axial intermediate section,
so that both surface pressures between the shaft (2) and the gear (4) at the third shrink-fit bond (10) and a maximum torque that can be transmitted from the gear (4) to the shaft (2) by the third shrink-fit bond (10) are, respectively, greater than a surface pressure between the shaft (2) and the gear (4) at the first shirk-fit bond (8) and the maximum torque that can be transmitted by the first shrink-fit bond (8), and
both surface pressures between the shaft (2) and the gear (4) at the second shrink-fit bond (9) and a maximum torque that can be transmitted from the gear (4) to the shaft (2) by the second shrink-fit bond (9) are, respectively, greater than the surface pressure between the shaft (2) and the gear (4) at the third shirk-fit bond (10) and the maximum torque that can be transmitted by the third shrink-fit bond (10), and
forming the axial first section, the axial second section, and the axial intermediate section to one of:
comprise of different materials,
have different diameters, and
have different surface roughness.

13. The method of producing a shaft-gear connection according to claim 12, further comprising the steps of
providing the external gear teeth have a base that is ground, and
providing the axial second section without any gearing.

14. The method of producing a shaft-gear connection according to claim 13, further comprising the step of grinding the bases of the gear teeth by at least one of sand blasting and glass-bead blasting.

15. The method of producing a shaft-gear connection according to claim 14, further comprising the step of grinding the bases of the gear teeth by two different successive blasting methods.

16. The method of producing a shaft-gear connection according to claim 12, further comprising the step of friction welding the shaft and the gear either during the shrink-fitting procedure or after the shrink-fitting procedure by relative twisting of the shaft and the gear with respect to one another.

17. A shaft-gear connection comprising a shaft (2) having a cylindrical external diameter and a shrunk-on gear (4) having an internal diameter that has an axial cylindrical first section (5), which is attached to the cylindrical external diameter of the shaft (2) by a first shrink-fit bond (8) exerting a first constriction force on the shaft (2), with an exterior diameter of the axial cylindrical first section (5) supporting a plurality of external gear teeth (12);
an axial cylindrical second section (6) being attached to the cylindrical external diameter of the shaft (2) by a second shrink-fit bond (9) exerting a second constriction force on the shaft (2) that is greater than the first constriction force, so that the second shrink-fit bond (9) enables a greater maximum transmittable torque from the gear (4) to the shaft (2) than a maximum transmittable torque by the first shrink-fit bond (8);
an axial intermediate section (7) being located between the axial cylindrical first section (5) and the axial cylindrical second section (6) and being attached to the external diameter of the shaft (2) by a third shrink-fit bond (10) exerting a third constriction force on the shaft (2) which is greater than the first constriction force but is less than the second constriction force, so that a maximum transmittable torque from the gear (4) to the shaft (2) by the third shrink-fit bond (10) is greater than the maximum transmittable torque by the first shrink-fit bond (8) but less than the maximum transmittable torque by the second shrink-fit bond (9);
the axial cylindrical first section (5) having a first diameter, the axial cylindrical intermediate section (7) having an average diameter smaller than the first diameter of the axial first section (5), and the cylindrical axial second section (6) having a second diameter smaller than the average diameter of the axial intermediate section (7), and the axial first section (5), the axial second section (6), and the axial intermediate section (7) at least one of:
comprising different materials,
having different diameters, and
having different surface roughness.

18. The shaft-gear connection according to claim 17, wherein the diameter of the axial intermediate section (7) decreases in diameter from an end of the axial cylindrical first section (5) to a beginning of the axial cylindrical second section (6).

19. The shaft-gear connection according to claim 1, wherein the shaft (2) has a constant exterior diameter while the gear (4) has at least three different through bore internal diameters for each of the axial intermediate section (7), the axial cylindrical first section (5) and the axial cylindrical second section (6).

20. The shaft-gear connection according to claim 1, wherein the gear (4) has a constant through bore internal diameter while the shaft (2) has at least three different exterior diameters for each of the axial intermediate section (7), the axial cylindrical first section (5) and the axial cylindrical second section (6).

* * * * *